(12) United States Patent
Huang

(10) Patent No.: US 12,041,646 B2
(45) Date of Patent: Jul. 16, 2024

(54) PACKET OFFLOADING METHOD, MOBILE TERMINAL, AND STORAGE MEDIUM

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 364 days.

(21) Appl. No.: 17/387,994

(22) Filed: Jul. 28, 2021

(65) Prior Publication Data

US 2021/0360650 A1    Nov. 18, 2021

Related U.S. Application Data

(63) Continuation of application No. PCT/CN2020/074906, filed on Feb. 12, 2020.

(30) Foreign Application Priority Data

Feb. 12, 2019  (CN) .......................... 201910111708.7

(51) Int. Cl.
*H04W 72/12* (2023.01)
*H04W 72/04* (2023.01)
(Continued)

(52) U.S. Cl.
CPC ..... *H04W 72/542* (2023.01); *H04W 72/0453* (2013.01); *H04W 72/1215* (2013.01);
(Continued)

(58) Field of Classification Search
CPC .......... H04W 72/542; H04W 72/0453; H04W 72/1215; H04W 72/21; H04W 84/12;
(Continued)

(56) References Cited

U.S. PATENT DOCUMENTS

2013/0137423 A1   5/2013  Das et al.
2015/0237519 A1*  8/2015  Ghai ................... H04L 63/0892
                                                          370/252
(Continued)

FOREIGN PATENT DOCUMENTS

CN        102647771       8/2012
CN        102768768       11/2012
(Continued)

OTHER PUBLICATIONS

EPO, Extended European Search Report for EP Application No. 20755808.1, Feb. 22, 2022.
(Continued)

*Primary Examiner* — Candal Elpenord
(74) *Attorney, Agent, or Firm* — Hodgson Russ LLP

(57) ABSTRACT

The disclosure provides a packet offloading method, a mobile terminal, and a storage medium, the method comprising: detecting the link quality of a first Wi-Fi data link, detecting the link quality of a second Wi-Fi data link, and detecting the link quality of a mobile data link; based on the link quality of the first Wi-Fi data link, the link quality of the second Wi-Fi data link, and the link quality of the mobile data link, determining a packet allocation ratio between the first Wi-Fi data link, the second Wi-Fi data link, and the mobile data link; and transmitting packets to be transmitted over the first Wi-Fi data link, the second Wi-Fi data link, and the mobile data link according to the packet allocation ratio.

20 Claims, 6 Drawing Sheets

(51) Int. Cl.
*H04W 72/0453* (2023.01)
*H04W 72/08* (2009.01)
*H04W 72/21* (2023.01)
*H04W 72/542* (2023.01)
*H04W 84/12* (2009.01)
*H04W 88/06* (2009.01)

(52) U.S. Cl.
CPC ............ *H04W 72/21* (2023.01); *H04W 84/12* (2013.01); *H04W 88/06* (2013.01)

(58) Field of Classification Search
CPC ............ H04W 88/06; H04W 28/0231; H04W 28/0236; H04W 28/0838; H04W 28/0865; H04W 28/0933; H04W 28/0967; H04W 76/16; H04W 24/08
USPC .......................................... 370/241, 329–330
See application file for complete search history.

(56) References Cited

U.S. PATENT DOCUMENTS

2017/0295512 A1* 10/2017 Rangaswamy ... H04W 28/0205
2019/0098566 A1* 3/2019 Li .......................... H04W 88/06
2020/0120556 A1* 4/2020 Gargaro ................ H04W 36/26

FOREIGN PATENT DOCUMENTS

| | | |
|---|---|---|
| CN | 102883306 | 1/2013 |
| CN | 102905319 | 1/2013 |
| CN | 103517323 | 1/2014 |
| CN | 105191398 | 12/2015 |
| CN | 106304091 | 1/2017 |
| CN | 107426781 | 12/2017 |
| CN | 107635248 | 1/2018 |
| CN | 107708216 | 2/2018 |
| CN | 107770814 | 3/2018 |
| CN | 107770841 | 3/2018 |
| WO | 2016095423 | 6/2016 |

OTHER PUBLICATIONS

WIPO, International Search Report and Written Opinion for PCT/CN2020/074906, Apr. 30, 2020.

CNIPA, First Office Action for CN Application No. 201910111708.7, Mar. 3, 2020.

CNIPA, Second Office Action for CN Application No. 201910111708.7, Jul. 24, 2020.

CNIPA, Notification to Grant Patent Right for Invention for CN Application No. 201910111708.7, Oct. 27, 2020.

EPO, Communication for EP Application No. 20755808.1, Feb. 16, 2024.

* cited by examiner

PACKET OFFLOADING METHOD, MOBILE TERMINAL, AND STORAGE MEDIUM

CROSS REFERENCE TO RELATED APPLICATION

This application is a continuation of International Application No. PCT/CN2020/074906, filed Feb. 12, 2020, which claims priority to Chinese Patent Application No. 201910111708.7, filed Feb. 12, 2019, the entire disclosures of which are incorporated herein by reference.

TECHNICAL FIELD

This application relates to the field of communication technology, and more particularly, to a packet offloading method and apparatus, a mobile terminal, and a storage medium.

BACKGROUND

At present, when a mobile terminal is surfing the Internet, the switch of the WiFi network and the switch of the mobile data network can be turned on at the same time, and at this time, the mobile terminal will preferentially access the Internet via the WiFi network. If the speed of the WiFi network is slow, the user needs to manually turn off the switch of the WiFi network and only use the mobile data network. Although the switch of the WiFi network and the switch of the mobile data network are turned on at the same time, the mobile terminal can only use one of the WiFi network and the mobile data network to surf the Internet at a time, and cannot make full use of the WiFi network and the mobile data network.

SUMMARY

The embodiments of the disclosure provide a packet offloading method and apparatus, a mobile terminal, and a storage medium, which make full use of the packet sending and receiving capabilities of the WiFi network and the mobile data network.

In a first aspect, an embodiment of the disclosure provides a packet offloading method, including:
- detecting the link quality of a first WiFi data link, the link quality of a second WiFi data link, and the link quality of a mobile data link;
- determining a packet allocation ratio of the first WiFi data link, the second WiFi data link, and the mobile data link, according to the link quality of the first WiFi data link, the link quality of the second WiFi data link, and the link quality of the mobile data link; and
- allocating, in accordance with the packet allocation ratio, a plurality of packets to at least one of the first WiFi data link, the second WiFi data link, and the mobile data link, and transmitting the plurality of packets through the at least one of the first WiFi data link, the second WiFi data link, and the mobile data link.

In a second aspect, an embodiment of the disclosure provides a mobile terminal, the mobile terminal includes a processor and a memory storing one or more programs, when the one or more programs are executed by the processor, the processor is configured to perform part or all of the steps in the first aspect of the embodiments of the disclosure.

In a third aspect, an embodiment of the disclosure provides a computer-readable storage medium, the computer-readable storage medium stores a computer program for electronic data exchange, the computer program, when executed by a computer, causes the computer to perform part or all of the steps described in the first aspect of the embodiments of the disclosure.

BRIEF DESCRIPTION OF THE DRAWINGS

In order to more clearly describe the technical solutions in the embodiments of the disclosure or in the prior art, the drawings that need to be used in the description of the embodiments or the prior art will be briefly introduced below. It is obvious that, the drawings in the following description are only some embodiments of the disclosure, for those of ordinary skill in the art, other drawings can be obtained based on these drawings without paying a creative work.

DETAILED DESCRIPTION OF PREFERRED EMBODIMENTS

In order to enable those of ordinary skill in the art to better understand the solutions of the disclosure, the technical solutions in the embodiments of the disclosure will be described clearly and completely in combination with the drawings in the embodiments of the disclosure. It is obvious that, the described embodiments are only some of the embodiments of this application, rather than all the embodiments. Based on the embodiments of the disclosure, all other embodiments obtained by those of ordinary skill in the art without paying a creative work shall fall within the protection scope of the present application.

The terms "first", "second", etc. in the specification, claims, and drawings of the disclosure are used to distinguish different objects, but not to describe a specific sequence. In addition, the terms "including", "having", and any variations thereof are intended to cover non-exclusive inclusion. For example, a process, a method, a system, a product, or a device that includes a series of steps or units is not limited to the listed steps or units, but optionally includes unlisted steps or units, or optionally includes other steps or units inherent to this process, method, product, or device.

Mentioning "embodiment" herein means that a specific feature, structure, or characteristic described in combination with the embodiment may be included in at least one embodiment of the disclosure. The appearance of "embodiment" in various places of the specification does not necessarily refer to the same embodiment, nor is it an independent or alternative embodiment mutually exclusive with other embodiments. Those of ordinary skill in the art explicitly and implicitly understand that the embodiments described herein can be combined with other embodiments.

The mobile terminal involved in the embodiments of the disclosure may include various handheld devices, in-vehicle devices, wearable devices and computing devices with wireless communication functions, or other processing devices connected to wireless modems, and various forms of User Equipment (UE), Mobile Station (MS), terminal device, etc. For the convenience of description, the devices mentioned above are all referred to as mobile terminals.

The embodiments of the disclosure are described in detail below.

Figure 1:
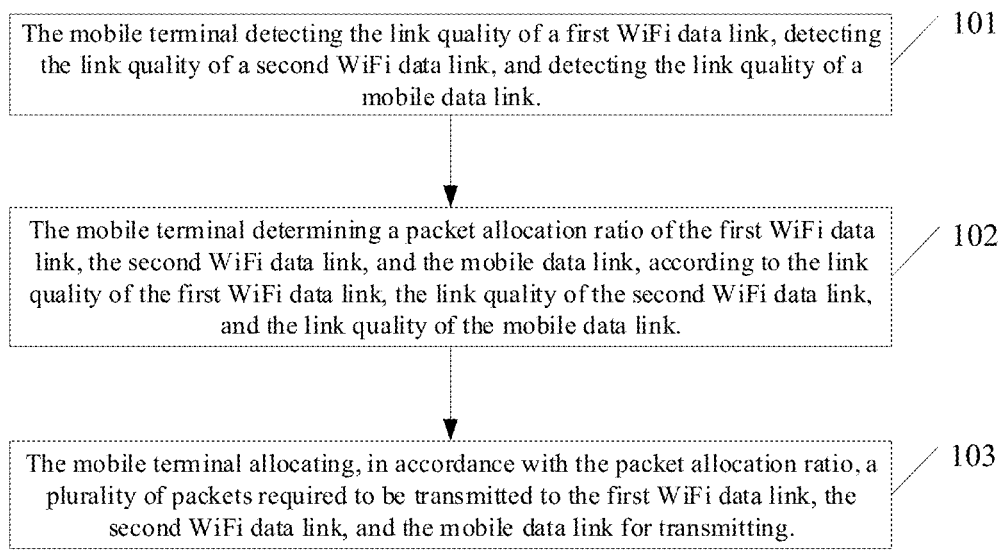
FIG. 1 is a schematic flowchart showing a packet offloading method according to an embodiment of the disclosure.

FIG. 1 illustrates a schematic flowchart of a packet offloading method according to an embodiment of the disclosure. As shown in FIG. 1, the packet offloading method includes the following steps.

S101: the mobile terminal detecting the link quality of a first WiFi data link, detecting the link quality of a second WiFi data link, and detecting the link quality of a mobile data link.

In some embodiments of the disclosure, Wireless-Fidelity (WiFi), which may also be referred to as wifi or Wi-Fi, is a wireless connection. The mobile terminal may include a WiFi module (may also be referred to as a WiFi communication module), so that the mobile terminal has a WiFi function. The mobile terminal may include a first WiFi module and a second WiFi module to support simultaneous transmission and reception of signals in two WiFi bands. The first WiFi module and the second WiFi module support different frequency bands. For example, the first WiFi module supports the 2.4G (Hz) band, and the second WiFi module supports the 5G (Hz) band; or alternatively, the first WiFi module supports the 5G band, and the second WiFi module supports the 2.4G band.

The radio frequency circuit system of the mobile terminal has a Dual Band Dual Concurrent (DBDC) function, and supports 2×2 antennas. Both sets of antennas are equipped with amplifier circuits and power amplifier chips, which can support the antennas to transmit and receive signals at the same time on the hardware circuit. The first WiFi module and the second WiFi module of the disclosure are both in Station mode (abbreviated as STA mode), and the first WiFi module and the second WiFi module need to be connected to a WiFi hotspot to access a WiFi network. When the first WiFi module and the second WiFi module of the disclosure work at the same time, they are in dual WiFi mode. The dual WiFi mode is a mode in which two WiFi modules transmit and receive data at the same time, in the dual WiFi mode, the first WiFi module and the second WiFi module work in parallel without interfering with each other.

Before performing step S101, the mobile terminal can search for WiFi hotspots. If two WiFi hotspots of different frequency bands are found, the mobile terminal may respectively connect to two WiFi hotspots of different frequency bands. The mobile terminal connects to the wireless network through two WiFi hotspots of different frequency bands.

The first WiFi data link is a data connection path established between the mobile terminal and the wireless network through the first WiFi communication module interface (supporting the first WiFi band). The second WiFi data link is a data connection path established between the mobile terminal and the wireless network through the second WiFi communication module interface (supporting the second WiFi band). The first WiFi data link supports transmission and reception of data in the first WiFi band, and the second WiFi data link supports transmission and reception of data in the second WiFi band. The first WiFi band is different from the second WiFi band, for example, the first WiFi band is the 2.4G band, and the second WiFi band is the 5G band.

When the mobile terminal surfs the Internet through the first WiFi hotspot or the second WiFi hotspot, it may access the Internet without the networks of operators such as China Mobile, China Unicom, and China Telecom, which can save traffic charges.

A mobile data link is a data connection path established between the mobile terminal and the wireless network through the cellular communication module interface. The cellular communication module interface may be a 3G/4G/5G communication module interface. Packets transmitted in the first WiFi data link need to pass through the first WiFi hotspot, packets transmitted in the second WiFi data link need to pass through the second WiFi hotspot, and packets transmitted in the mobile data link need to pass through the base station of the Service Provider.

The link quality of the first WiFi data link can be determined by the uplink and downlink data transmission rate, round-trip time, packet loss rate, and bit error rate of the first WiFi data link. The higher the uplink and downlink data transmission rate, the higher the link quality of the first WiFi data link; the smaller the round-trip time, the higher the link quality of the first WiFi data link; the lower the packet loss rate, the higher the link quality of the first WiFi data link; and the lower the bit error rate, the higher the link quality of the first WiFi data link. The lower the uplink and downlink data transmission rate, the lower the link quality of the first WiFi data link; the larger the round-trip time, the lower the link quality of the first WiFi data link; the higher the packet loss rate, the lower the link quality of the first WiFi data link; and the higher the bit error rate, the lower the link quality of the first WiFi data link. Similarly, the link quality of the second WiFi data link can be determined by the uplink and downlink data transmission rate, round-trip time, packet loss rate, and bit error rate of the second WiFi data link.

The first WiFi data link may include a first WiFi uplink data link and a first WiFi downlink data link. The quality of the first WiFi uplink data link may be determined by the uplink data transmission rate, round-trip time, packet loss rate, and bit error rate of the first WiFi data link. The quality of the first WiFi downlink data link may be determined by the downlink data transmission rate, round-trip time, packet loss rate, and bit error rate of the first WiFi data link. Similarly, the second WiFi data link may include a second WiFi uplink data link and a second WiFi downlink data link.

The link quality of the mobile data link can be determined by the uplink and downlink data transmission rate, round-trip time, packet loss rate, and bit error rate of the mobile data link. The higher the uplink and downlink data transmission rate, the higher the link quality of the mobile data link; the smaller the round-trip time, the higher the link quality of the mobile data link; the lower the packet loss rate, the higher the link quality of the mobile data link; and the lower the bit error rate, the higher the link quality of the mobile data link. The lower the uplink and downlink data transmission rate, the lower the link quality of the mobile data link; the larger the round-trip time, the lower the link quality of the mobile data link; the higher the packet loss rate, the lower the link quality of the mobile data link; and the higher the bit error rate, the lower the link quality of the mobile data link.

The mobile data link may include a mobile uplink data link and a mobile downlink data link. The quality of the mobile uplink data link may be determined by the uplink data transmission rate, round-trip time, packet loss rate, and bit error rate of the mobile data link. The quality of the mobile downlink data link may be determined by the downlink data transmission rate, round-trip time, packet loss rate, and bit error rate of the mobile data link.

The bit error rate is an index that measures the accuracy of data transmission within a specified time. Where (bit error rate)=(number of bits transmitted in error)/(total number of bits transmitted)*100%.

The packet loss rate is the ratio of the number of packets lost to the total number of packets transmitted.

Before performing step S101, the mobile terminal may enable the smart link aggregation function. The mobile terminal may also open the WiFi connection and the mobile data connection at the same time.

In some embodiments of the disclosure, link aggregation means that a device can use two or more network ports to access the Internet at the same time. For example, the mobile phone may use two WiFi networks and one data network (may also be referred to as mobile data network) for network access at the same time through link aggregation. The Smart Link Aggregation (SLA) function refers to the smart allocation of users' Internet access requests to different Internet access interfaces (cellular communication module interface, first WiFi communication module interface, and second WiFi communication module interface). Link aggregation requires at least two accessible networks, so the prerequisite of the SLA is to make WiFi and data networks coexist.

When the mobile terminal enables the smart link aggregation function, the mobile terminal can send a network request to the network terminal to enable the data network, such that the mobile terminal can use the WiFi network and the mobile data network at the same time when the WiFi network and data network are turned on at the same time.

The disclosure may be applied to indoor scenes or in-vehicle scenes. For in-vehicle scenes, the mobile terminal may connect to two in-vehicle WiFi hotspots of different frequency bands at the same time, and the two in-vehicle WiFi hotspots of different frequency bands may be integrated on one device or located on two devices respectively. The mobile terminal may connect to an in-vehicle WiFi hotspot and a mobile phone WiFi hotspot at the same time, and the frequency bands of the in-vehicle WiFi hotspot and the mobile phone WiFi hotspot are different. The mobile phone WiFi hotspot is in soft access point (soft AP) mode, which allows at least one external device to access the Internet.

In the in-vehicle scene, in-vehicle WiFi hotspots, mobile phone WiFi hotspots, and mobile data networks are essentially operator networks (the in-vehicle WiFi hotspot can be turned on by inserting the SIM card of the operator, and the mobile phone WiFi hotspot also needs to use the SIM card for traffic flow). Due to the rapid moving speed of mobile terminals in the in-vehicle scene and the differences in the coverage of base stations of different operators, the network qualities of in-vehicle WiFi hotspots, mobile phone WiFi hotspots, and mobile data networks will undergo great changes during the rapid movement of mobile terminals. That is, the link qualities of the first WiFi data link, the second WiFi data link, and the mobile data link tend to change dynamically. In the implementation of the embodiments of the disclosure, the packet allocation ratio of the first WiFi data link, the second WiFi data link, and the mobile data link can be dynamically adjusted in the in-vehicle scene, so as to improve user experiences.

The number of operator networks with different data links to which the mobile terminal is connected can be as many as possible. The operator network corresponding to the first WiFi data link, the operator network corresponding to the second WiFi data link, and the operator network corresponding to the mobile data link are different. For example, the first WiFi data link corresponds to the Mobile operator network, the second WiFi data link corresponds to the Unicom operator network, and the mobile data link corresponds to the Telecom operator network. Due to the differences in the coverage of base stations of different operators, by making full use of the coverage capabilities of base stations of different operators, the risk of unstable network speed during the Internet surfing process of the mobile terminal can be reduced.

Optionally, the mobile terminal detecting the link quality of the first WiFi data link may specifically include the following steps.

The mobile terminal tests the data transmission rate, round-trip time, packet loss rate, and bit error rate of the first WiFi data link, and determines the link quality of the first WiFi data link based on the round-trip time, data transmission rate, packet loss rate, and bit error rate of the first WiFi data link.

The mobile terminal detecting the link quality of the second WiFi data link may specifically include the following steps.

The mobile terminal tests the data transmission rate, round-trip time, packet loss rate, and bit error rate of the second WiFi data link, and determines the link quality of the second WiFi data link based on the round-trip time, data transmission rate, packet loss rate, and bit error rate of the second WiFi data link.

The mobile terminal detecting the link quality of the mobile data link may specifically include the following steps.

The mobile terminal tests the data transmission rate, round-trip time, packet loss rate, and bit error rate of the mobile data link, and determines the link quality of the mobile data link based on the round-trip time, data transmission rate, packet loss rate, and bit error rate of the mobile data link.

S102: the mobile terminal determining a packet allocation ratio of the first WiFi data link, the second WiFi data link, and the mobile data link, according to the link quality of the first WiFi data link, the link quality of the second WiFi data link, and the link quality of the mobile data link.

In some embodiments of the disclosure, if the link quality of the first WiFi data link is better than that of the second WiFi data link and the mobile data link, the packet proportion of the first WiFi data link is determined to be the highest; if the link quality of the second WiFi data link is better than that of the first WiFi data link and the mobile data link, the packet proportion of the second WiFi data link is determined to be the highest; if the link quality of the mobile data link is better than that of the first WiFi data link and the second WiFi data link, the packet proportion of the mobile data link is determined to be the highest. For example, if the link quality of the first WiFi data link is 20, the link quality of the second WiFi data link is 30, and the link quality of the mobile data link is 50, then the packet allocation ratio of the first WiFi data link, the second WiFi data link, and the mobile data link is 2:3:5.

The link quality of the first WiFi data link may be scored based on the uplink and downlink data transmission rate, round-trip time, packet loss rate, and bit error rate of the first WiFi data link to obtain the quality score of the first WiFi data link. Similarly, the quality scores of the second WiFi data link and the mobile data link may also be obtained in this way. The mobile terminal can take the ratio of the quality score of the first WiFi data link, the quality score of the second WiFi data link, and the quality score of the mobile data link as the packet allocation ratio of the first WiFi data link, the second WiFi data link, and the mobile data link.

The mobile terminal may also determine the quality level of the first WiFi data link according to the quality score of the first WiFi data link, determine the quality level of the second WiFi data link according to the quality score of the second WiFi data link, and determine the quality level of the mobile data link according to the quality score of the mobile data link. And the mobile terminal can determine the packet allocation ratio of the first WiFi data link, the second WiFi data link, and the mobile data link based on the quality level of the first WiFi data link, the quality level of the second WiFi data link, and the quality level of the mobile data link.

For example, the quality levels of the first WiFi data link, the second WiFi data link, and the mobile data link can be set as level I, level II, level III, level IV, and level V, which respectively represent the link quality being very poor, poor, medium, good, and excellent. Level I, level II, level III, level IV, and level V respectively correspond to the quality score being 0~30, 30~60, 60~80, 80~90, and 90~100. The packet allocation ratio of the first WiFi data link, the second WiFi data link, and the mobile data link can be determined according to the ratio of the quality level of the first WiFi data link, the quality level of the second WiFi data link, and the quality level of the mobile data link. For example, if the link quality of the first WiFi data link is level I, the link quality of the second WiFi data link is level I, and the link quality of the mobile data link is level I, then the packet allocation ratio of the first WiFi data link, the second WiFi data link, and the mobile data link is 1:1:1. For another example, if the link quality of the first WiFi data link is level I, the link quality of the second WiFi data link is level IV, and the quality level of the mobile data link is level II, then the packet allocation ratio of the first WiFi data link, the second WiFi data link, and the mobile data link is 1:4:2.

S103: the mobile terminal allocating, in accordance with the packet allocation ratio, a plurality of packets required to be transmitted to the first WiFi data link, the second WiFi data link, and the mobile data link for transmitting.

In some embodiments of the disclosure, the mobile terminal can send uplink packets and can also receive downlink packets. The packets to be transmitted can be uplink packets or downlink packets. For the uplink packets, the mobile terminal can allocate the uplink packets to the first WiFi uplink data link, the second WiFi uplink data link, and the mobile uplink data link for transmission. For the downlink packets, the mobile terminal can allocate the downlink packets to the first WiFi downlink data link, the second WiFi downlink data link, and the mobile downlink data link for transmission.

The packets to be transmitted can be initiated by different services in the mobile terminal. For example, the packets to be transmitted may be initiated by any one of video service, game service, voice service, and instant messaging service.

Before the mobile terminal allocating, in accordance with the packet allocation ratio, a plurality of packets required to be transmitted to the first WiFi data link, the second WiFi data link, and the mobile data link for transmitting, the following steps may be further included.

The mobile terminal performs the first WiFi data link labeling, the second WiFi data link labeling, or the mobile data link labeling on the plurality of packets required to be transmitted to obtain the label value of each packet, establishes the label value routing table, and updates it to the route node.

The mobile terminal allocating, in accordance with the packet allocation ratio, a plurality of packets required to be transmitted to the first WiFi data link, the second WiFi data link, and the mobile data link for transmitting may specifically include the following steps.

In the process of transmitting a plurality of packets required to be transmitted, the mobile terminal obtains the label values of the plurality of packets required to be transmitted, determines the corresponding data link of each of the plurality of packets required to be transmitted according to the label value routing table in the routing table of each routing node, and allocates the plurality of packets required to be transmitted to the corresponding data links for transmission.

Optionally, in step S101, the mobile terminal detecting the link quality of a first WiFi data link, detecting the link quality of a second WiFi data link, and detecting the link quality of a mobile data link may specifically include the following steps.

The mobile terminal tests the maximum data transmission rate of the first WiFi data link, the maximum data transmission rate of the second WiFi data link, and the maximum data transmission rate of the mobile data link, and determines the link quality of the first WiFi data link, the link quality of the second WiFi data link, and the link quality of the mobile data link based on the maximum data transmission rate of the first WiFi data link, the maximum data transmission rate of the second WiFi data link, and the maximum data transmission rate of the mobile data link.

In some embodiments of the disclosure, the mobile data network, for example, is illustrated to be a Long Term Evolution (LTE) network. The link quality of the first WiFi data link, the link quality of the second WiFi data link, and the link quality of the LTE data link can be calculated according to the following formula:

$$\text{weigh\_wifi\_1} = \text{max\_speed\_wifi\_1} / (\text{max\_speed\_wifi\_1} + \text{max\_speed\_wifi\_2} + \text{max\_speed\_lte})$$

$$\text{weigh\_wifi\_2} = \text{max\_speed\_wifi\_2} / (\text{max\_speed\_wifi\_1} + \text{max\_speed\_wifi\_2} + \text{max\_speed\_lte})$$

$$\text{weigh\_lte} = 1 - \text{weigh\_wifi\_1} - \text{weigh\_wifi\_2}$$

where weigh_wifi_1 represents the link quality of the first WiFi data link, weigh_wifi_2 represents the link quality of the second WiFi data link, weigh_lte represents the link quality of the LTE data link, max_speed_wifi_1 represents the maximum data transmission rate of the first WiFi data link, max_speed_wifi_2 represents the maximum data transmission rate of the second WiFi data link, and max_speed_lte represents the maximum data transmission rate of the LTE data link. The sum of the link quality of the first WiFi data link, the link quality of the second WiFi data link, and the link quality of the LTE data link is equal to 1.

The mobile terminal can determine the packet allocation ratio of the first WiFi data link, the second WiFi data link, and the mobile data link according to the ratio of the link quality of the first WiFi data link, the link quality of the second WiFi data link, and the link quality of the mobile data link.

For example, the link quality of the first WiFi data link is 0.3, the link quality of the second WiFi data link is 0.5, and the link quality of the LTE data link is 0.2. The packet allocation ratio of the first WiFi data link, the second WiFi data link, and the mobile data link is 3:5:2.

Optionally, the maximum data transmission rate of the first WiFi data link, the maximum data transmission rate of the second WiFi data link, and the maximum data transmission rate of the LTE data link can be corrected respectively according to the speed calculated from the data increment on the WiFi/LTE reception (rx) interface.

For example, the data increments on the first WiFi receiving (rx) interface, the second WiFi receiving (rx) interface, and the LTE receiving (rx) interface are counted every is to calculate the speeds, and the speeds calculated from data increments are used to correct the maximum data transmission rate of the first WiFi data link, the maximum data transmission rate of the second WiFi data link, and the maximum data transmission rate of the mobile data link, respectively.

$$tmp\_speed=(rx\_bytes-last\_rx\_bytes)/1$$

$$corrected\ max\_speed\_wifi\_1=max(max\_speed\_wifi\_1, tmp\_speed)$$

$$corrected\ max\_speed\_wifi\_2=max(max\_speed\_wifi\_2, tmp\_speed)$$

$$corrected\ max\_speed\_lte=max(max\_speed\_lte, tmp\_speed)$$

where rx_bytes represents the amount of data received on the first WiFi receiving interface, the second WiFi receiving interface, and the LTE receiving interface in one second, last_rx_bytes represents the amount of data received on the first WiFi receiving interface, the second WiFi receiving interface, and the LTE receiving interface in the last second, tmp_speed represents the speed calculated from data increment, max_speed_wifi_1 represents the maximum data transmission rate of the first WiFi data link, max_speed_wifi_2 represents the maximum data transmission rate of the second WiFi data link, and max_speed_lte represents the maximum data transmission rate of the LTE data link. The corrected max_speed_wifi_1 is the maximum of max_speed_wifi_1 and tmp_speed, the corrected max_speed_wifi_2 is the maximum of max_speed_wifi_2 and tmp_speed, and the corrected max_speed_lte is the maximum of max_speed_lte and tmp_speed.

Optionally, the maximum data transmission rate of the LTE data link, the maximum data transmission rate of the first WiFi data link, and the maximum data transmission rate of the second WiFi data link can be corrected by counting the Round-Trip Time (rtt).

For example, the mobile terminal can calculate the delay on the two interfaces (the WiFi communication module interface and the LTE communication module interface) based on the rtt of the tcp protocol itself, for each data link, only the rtt of the first request after three-way handshake are calculated, such as the rtt of http get, and the rtt of http post. The three-way handshake refers to the three confirmation processes for TCP to establish a connection. The Transmission Control Protocol (tcp) uses tcp_rtt_estimator( ) to count rtt and then calculate the Retransmission Timeout (RTO), so the delay is calculated in tcp_rtt_estimator( ).

The mobile terminal determining the current first RTT of the first WiFi data link, the current first RTT of the second WiFi data link, and the current first RTT of the mobile data link, respectively, including:

the mobile terminal determining the second RTT running a TCP;

the mobile terminal acquiring the last determined third RTTs of the first WiFi communication module, the second WiFi communication module, and the cellular communication module, respectively; and the mobile terminal determining, according to the determined second RTT, and the acquired last determined third RTTs of the first WiFi communication module, the second WiFi communication module, and the cellular communication module, the current first RTT of the first WiFi data link, the current first RTT of the second WiFi data link, and the current first RTT of the mobile data link.

Specifically, the following formula may be used to calculate the current first RTT of the first WiFi data link, the current first RTT of the second WiFi data link, and the current first RTT of the mobile data link:

$$rtt\_wifi\_11=(rtt\_wifi\_13+rtt\_2)/2$$

$$rtt\_wifi\_21=(rtt\_wifi\_23+rtt\_2)/2$$

$$rtt\_lte\_1=(rtt\_lte\_3+rtt\_2)/2$$

where rtt_wifi_11 represents the current first RTT of the first WiFi data link, rtt_2 represents the second RTT running a TCP, rtt_wifi_13 represents the last determined third RTT of the first WiFi data link; rtt_wifi_21 represents the current first RTT of the second WiFi data link, rtt_2 represents the second RTT running a TCP, rtt_wifi_23 represents the last determined third RTT of the second WiFi data link; rtt_lte_1 represents the current first RTT of the LTE data link, rtt_2 represents the second RTT running a TCP, and rtt_lte_3 represents the last determined third RTT of the LTE data link.

The embodiments of the disclosure take the data transmission rate and the round-trip time into consideration, which can improve the calculation accuracy of the link qualities of the first WiFi data link, the second WiFi data link, and the mobile data link.

Steps S101 to S103 may be performed periodically, for example, every 30 seconds or 1 minute. Steps S101 to S103 may also be performed only when there is a foreground application running.

In the embodiments of the disclosure, the allocation ratio of the packets to be transmitted on the three links can be determined according to the link quality of the first WiFi data link, the link quality of the second WiFi data link, and the link quality of the mobile data link, and the packets can be reasonably allocated to two WiFi data links and one mobile data link for transmission, thereby making full use of the packet sending and receiving capabilities of the WiFi networks and the mobile data network, and improving user experiences.

Figure 2:
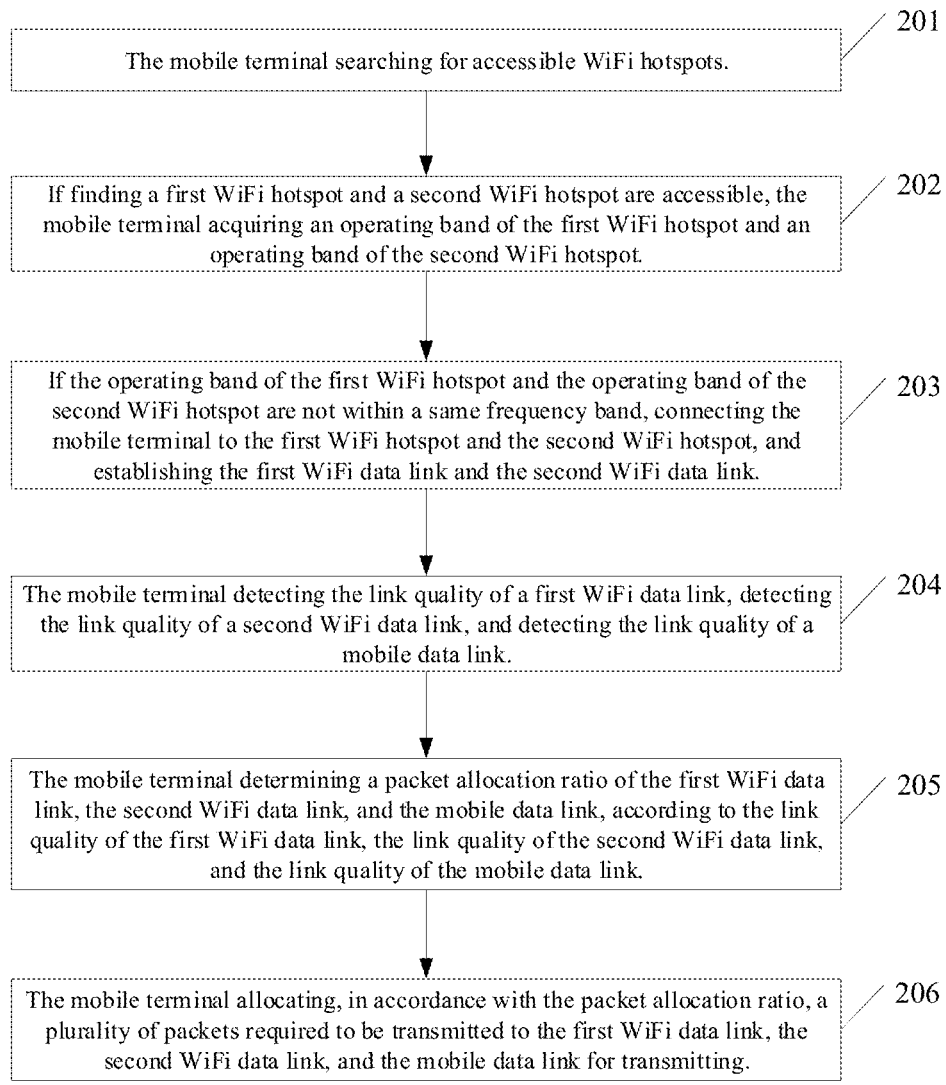
FIG. 2 is a schematic flowchart showing another packet offloading method according to an embodiment of the disclosure.

FIG. 2 illustrates a schematic flowchart of another packet offloading method according to an embodiment of the disclosure. FIG. 2 is further optimized on the basis of FIG. 1, as shown in FIG. 2, the packet offloading method includes the following steps.

S201: the mobile terminal searching for accessible WiFi hotspots.

S202: if finding a first WiFi hotspot and a second WiFi hotspot are accessible, the mobile terminal acquiring an operating band of the first WiFi hotspot and an operating band of the second WiFi hotspot.

S203: if the operating band of the first WiFi hotspot and the operating band of the second WiFi hotspot are not within a same frequency band, connecting the mobile terminal to the first WiFi hotspot and the second WiFi hotspot, and establishing the first WiFi data link and the second WiFi data link.

In the embodiment of the disclosure, after the mobile terminal turns on the WiFi network switch, the mobile terminal can search for accessible WiFi hotspots. Accessible WiFi hotspots refer to hotspots that can be connected to the wireless network through the WiFi hotspots. For example, some WiFi hotspots can be searched, but cannot be connected to the wireless network through the WiFi hotspots, then these WiFi hotspots can be filtered out.

Current WiFi hotspots generally include WiFi hotspots in the 2.4G band and WiFi hotspots in the 5G band. If the operating band of the first WiFi hotspot and the operating band of the second WiFi hotspot are not within a same frequency band, it indicates that one of the first WiFi hotspot and the second WiFi hotspot is the 2.4G band, and the other is the 5G band. Since the mobile terminal includes a first WiFi communication module and a second WiFi communication module, it can support simultaneous transmission and reception of signals in two WiFi bands. The mobile terminal can be connected to two WiFi hotspots of different frequency bands at the same time to establish a WiFi data link in a first frequency band and a WiFi data link in a second frequency band.

S204: the mobile terminal detecting the link quality of a first WiFi data link, detecting the link quality of a second WiFi data link, and detecting the link quality of a mobile data link.

S205: the mobile terminal determining a packet allocation ratio of the first WiFi data link, the second WiFi data link, and the mobile data link, according to the link quality of the first WiFi data link, the link quality of the second WiFi data link, and the link quality of the mobile data link.

S206: the mobile terminal allocating, in accordance with the packet allocation ratio, a plurality of packets required to be transmitted to the first WiFi data link, the second WiFi data link, and the mobile data link for transmitting.

For the specific implementation of steps S204 to S206 according to the embodiment of the disclosure, please refer to the detailed description of steps S101 to S103 shown in FIG. 1, which will not be repeated here.

Optionally, if the operating band of the first WiFi hotspot and the operating band of the second WiFi hotspot are within a same frequency band, the mobile terminal determines whether the first WiFi hotspot or the second WiFi hotspot is a dual-band WiFi hotspot.

If at least one of the first WiFi hotspot and the second WiFi hotspot is the dual-band WiFi hotspot, the mobile terminal sends a band switching instruction to the dual-band WiFi hotspot selected from the first WiFi hotspot and the second WiFi hotspot, and the band switching instruction is configured to switch the operating band of the dual-band WiFi hotspot selected from the first WiFi hotspot and the second WiFi hotspot.

If the operating band of the first WiFi hotspot and the operating band of the second WiFi hotspot are not within a same frequency band, continue to perform step S203, connecting the mobile terminal to the first WiFi hotspot and the second WiFi hotspot, and establishing the first WiFi data link and the second WiFi data link.

In the embodiment of the disclosure, the dual-band WiFi hotspot refers to a WiFi hotspot that supports two frequency bands. The dual-band WiFi hotspot can switch between two frequency bands.

After the mobile terminal sends a band switching instruction to the dual-band WiFi hotspot selected from the first WiFi hotspot and the second WiFi hotspot, the dual-band WiFi hotspot can switch the current operating band. For example, the previous operating band of the dual-band WiFi hotspot is 2.4G, and now the operating band of the dual-band WiFi hotspot can be switched from 2.4G to 5G.

If the frequency band of the dual-band WiFi hotspot is switched successfully, then the operating band of the first WiFi hotspot and the operating band of the second WiFi hotspot are not within a same frequency band. At this time, step S203 can be performed.

In the embodiment of the disclosure, when the frequency bands of the two WiFi hotspots connected by the mobile terminal are the same, in order to realize the function of the mobile terminal supporting the aggregation of two WiFi links, the operating band of the dual-band WiFi hotspot selected from the two WiFi hotspots can be switched, and the operating band of the dual-band WiFi hotspots connected by the mobile terminal can be switched intelligently, thereby meeting the requirement of connecting the mobile terminal to two WiFi hotspots of different frequency bands, so as to realize the aggregation of two WiFi links.

Figure 3:
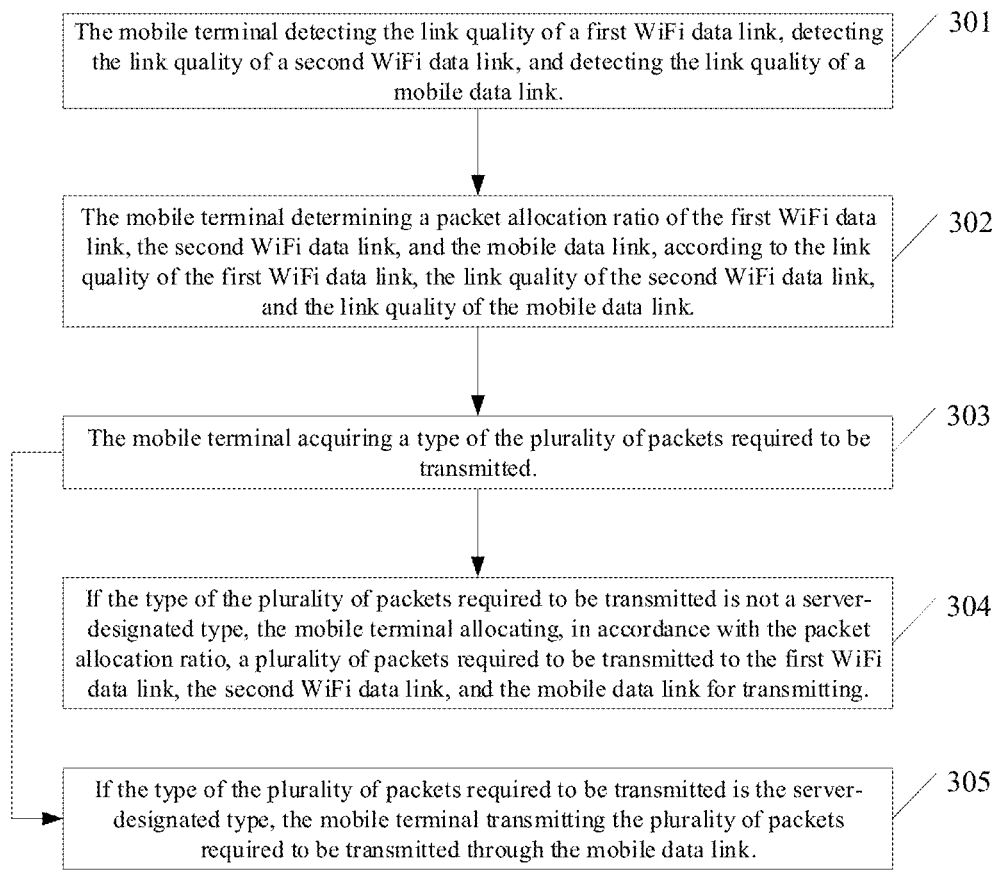
FIG. 3 is a schematic flowchart showing a further packet offloading method according to an embodiment of the disclosure.

FIG. 3 is a schematic flowchart of a further packet offloading method according to an embodiment of the disclosure. FIG. 3 is further optimized on the basis of FIG. 1, as shown in FIG. 3, the packet offloading method includes the following steps.

S301: the mobile terminal detecting the link quality of a first WiFi data link, detecting the link quality of a second WiFi data link, and detecting the link quality of a mobile data link.

S302: the mobile terminal determining a packet allocation ratio of the first WiFi data link, the second WiFi data link, and the mobile data link, according to the link quality of the first WiFi data link, the link quality of the second WiFi data link, and the link quality of the mobile data link.

S303: the mobile terminal acquiring a type of the plurality of packets required to be transmitted.

S304: if the type of the plurality of packets required to be transmitted is not a server-designated type, the mobile terminal allocating, in accordance with the packet allocation ratio, a plurality of packets required to be transmitted to the first WiFi data link, the second WiFi data link, and the mobile data link for transmitting.

S305: if the type of the plurality of packets required to be transmitted is the server-designated type, the mobile terminal transmitting the plurality of packets required to be transmitted through the mobile data link.

In the embodiment of the disclosure, packets of a server-designated type refer to packets that do not generate additional traffic charges. The types of packets may include a server-designated type and a non-server-designated type. The designated server refers to a designated application server. For example, for some traffic-free applications, if the user opens a traffic-free application, packets are transmitted between the mobile terminal and the application server corresponding to the traffic-free application. Therefore, when the mobile terminal sends packets to the application server corresponding to the traffic-free application, or when the mobile terminal receives packets sent by the application server corresponding to the traffic-free application, because no additional traffic charges will be incurred when packets are transmitted through the mobile data link, these packets are all transmitted through the mobile data link. For packets of a non-server-designated type, they are processed in accordance with the packet offloading strategy shown in FIG. 1.

For example, if a user purchases a Tencent network interface card, the mobile terminal can use Tencent-based applications (such as WeChat, QQ, Tencent News, Tencent Video, QQ Music, Honor of Kings, PlayerUnknown's Battlegrounds, etc.) for free. All Tencent-based applications can be used without generating additional traffic charges.

In the embodiment of the disclosure, the allocation ratio of the packets to be transmitted on the three links can be determined according to the link quality of the first WiFi data link, the link quality of the second WiFi data link, and the link quality of the mobile data link, and the packets can be reasonably allocated to two WiFi data links and one mobile data link for transmission, thereby making full use of the packet sending and receiving capabilities of the WiFi networks and the mobile data network. For packets of a server-designated type, since no additional tariffs will be incurred, the mobile terminal can use mobile data traffic directly, so as to avoid the use of offloading strategy for traffic-free applications, thereby improving user experiences.

Figure 4:
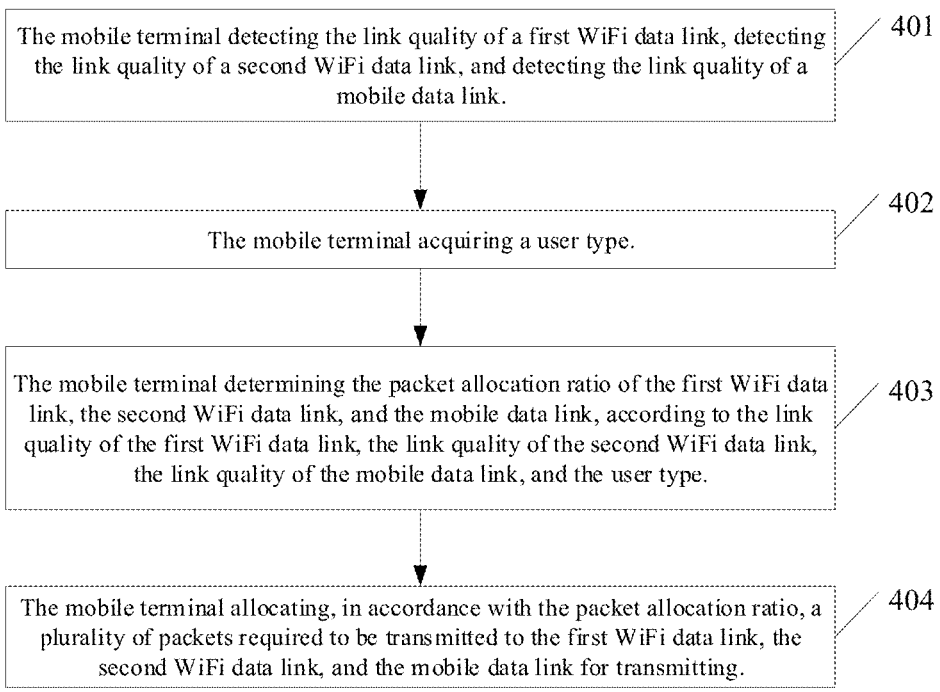
FIG. 4 is a schematic flowchart showing a still further packet offloading method according to an embodiment of the disclosure.

FIG. 4 illustrates a schematic flowchart of a still further packet offloading method according to an embodiment of the disclosure. FIG. 4 is further optimized on the basis of FIG. 1, as shown in FIG. 4, the packet offloading method includes the following steps.

S401: the mobile terminal detecting the link quality of a first WiFi data link, detecting the link quality of a second WiFi data link, and detecting the link quality of a mobile data link.

S402: the mobile terminal acquiring a user type.

In the embodiment of the disclosure, the user type may be determined according to the package of mobile data traffic purchased by the user and the usage of traffic. The user type may include the traffic-sensitive type and the non-traffic-sensitive type. For traffic-sensitive users, they are more cautious about using traffic, and they are more concerned about whether the used traffic exceeds the upper limit of the purchased traffic package. For non-traffic-sensitive users, they use traffic more casually and do not care whether the used traffic exceeds the upper limit of purchased traffic package.

If the traffic limit of the traffic package purchased by the user is lower than a certain threshold (for example, 1G), and there is no case that the used traffic exceeds the traffic limit of the traffic package in the user's historical traffic usage, the user can be considered as a traffic-sensitive user. If users purchase unlimited traffic packages, they can be considered as non-traffic-sensitive users.

S403: the mobile terminal determining the packet allocation ratio of the first WiFi data link, the second WiFi data link, and the mobile data link, according to the link quality of the first WiFi data link, the link quality of the second WiFi data link, the link quality of the mobile data link, and the user type.

In the embodiment of the disclosure, for traffic-sensitive users, the previously calculated packet allocation ratio can be changed by appropriately increasing a ratio of the first WiFi data link to the mobile data link and a ratio of the second WiFi data link to the mobile data link. For non-traffic-sensitive users, the previously calculated packet allocation ratio can be changed by appropriately decreasing or maintaining a ratio of the first WiFi data link to the mobile data link and a ratio of the second WiFi data link to the mobile data link. In the implementation of the disclosure, the packet allocation ratio of the first WiFi data link, the second WiFi data link, and the mobile data link can be readjusted according to the user type, which can save traffic charges for the user and improve user experiences.

Optionally, step S403 may specifically include the following steps:
    the mobile terminal determining an initial packet allocation ratio of the first WiFi data link, the second WiFi data link, and the mobile data link, according to the link quality of the first WiFi data link, the link quality of the second WiFi data link, the link quality of the mobile data link, and the user type;
    if the user type is a traffic-sensitive type, the mobile terminal changing the initial packet allocation ratio by increasing a ratio of the first WiFi data link to the mobile data link and a ratio of the second WiFi data link to the mobile data link, thereby obtaining the packet allocation ratio of the first WiFi data link, the second WiFi data link, and the mobile data link; and
    if the user type is a non-traffic-sensitive type, the mobile terminal changing the initial packet allocation ratio by decreasing a ratio of the first WiFi data link to the mobile data link and a ratio of the second WiFi data link to the mobile data link, thereby obtaining the packet allocation ratio of the first WiFi data link, the second WiFi data link, and the mobile data link.

The initial packet allocation ratio refers to a packet allocation ratio of the first WiFi data link, the second WiFi data link, and the mobile data link obtained before considering the user type.

In the implementation of the disclosure, the packet allocation ratio of the first WiFi data link, the second WiFi data link, and the mobile data link can be readjusted according to the user type. which can save traffic charges for traffic-sensitive users and improve user experiences for non-traffic-sensitive users.

S404: the mobile terminal allocating, in accordance with the packet allocation ratio, a plurality of packets required to be transmitted to the first WiFi data link, the second WiFi data link, and the mobile data link for transmitting.

For the specific implementation of steps S401 and S404 according to the embodiment of the disclosure, reference may be made to the detailed description of steps S101 and S103 shown in FIG. 1, which will not be repeated here.

In the embodiment of the disclosure, the allocation ratio of the packets to be transmitted on the three links can be determined according to the link quality of the first WiFi data link, the link quality of the second WiFi data link, and the link quality of the mobile data link, and the packets can be reasonably allocated to two WiFi data links and one mobile data link for transmission, thereby making full use of the packet sending and receiving capabilities of the WiFi networks and the mobile data network. The packet allocation ratio of the first WiFi data link, the second WiFi data link, and the mobile data link can be readjusted according to the user type. which can save traffic charges for traffic-sensitive users and improve user experiences for non-traffic-sensitive users.

The foregoing description mainly introduces the solutions of the embodiments of the disclosure from the perspective of the execution process on the method side. It can be understood that, in order to implement the above-mentioned functions, the mobile terminal includes corresponding hardware structures and/or software modules for implementing each function. For those of ordinary skill in the art, it is easy to realize that the disclosure can be implemented in the form of hardware or a combination of hardware and computer software in combination with the units and algorithm steps of each example described in the embodiments disclosed herein. Whether a certain function is executed by hardware or executed in a way that computer software drives hardware depends on the specific application and design constraint conditions of the technical solution. For each specific application, professionals and technicians can use different methods to implement the described functions, but such implementation should not be considered as going beyond the scope of the disclosure.

The embodiment of the disclosure may divide the functional units of the mobile terminal according to the method example. For example, each functional unit may be divided corresponding to each function, or two or more functions may be integrated into one processing unit. The integrated unit mentioned above can be implemented in the form of hardware or in the form of software functional unit. It should be noted that the division of units in the embodiment of the disclosure is illustrative, and is only a logical function division, and there may be other division methods in actual implementation.

Figure 5:
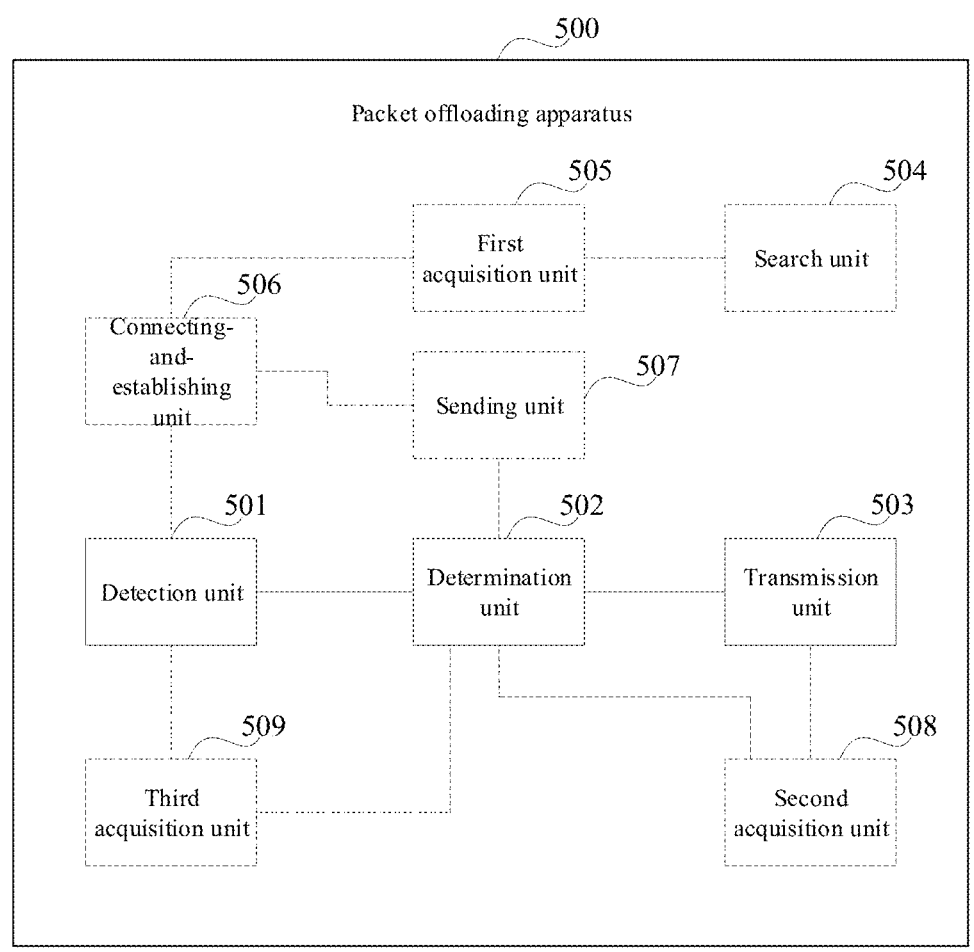
FIG. 5 is a schematic diagram showing the structure of a packet offloading apparatus according to an embodiment of the disclosure.

FIG. 5 illustrates a schematic diagram showing the structure of a packet offloading apparatus according to an embodiment of the disclosure. As shown in FIG. 5, the packet offloading apparatus 500 includes a detection unit 501, a determination unit 502, and a transmission unit 503.

The detection unit 501 is configured to detect the link quality of a first WiFi data link, detect the link quality of a second WiFi data link, and detect the link quality of a mobile data link.

The determination unit 502 is configured to determine a packet allocation ratio of the first WiFi data link, the second WiFi data link, and the mobile data link, according to the link quality of the first WiFi data link, the link quality of the second WiFi data link, and the link quality of the mobile data link.

The transmission unit 503 is configured to allocate, in accordance with the packet allocation ratio, a plurality of packets required to be transmitted to the first WiFi data link, the second WiFi data link, and the mobile data link for transmitting.

Optionally, the packet offloading apparatus 500 may further include a search unit 504, a first acquisition unit 505, and a connecting-and-establishing unit 506.

The search unit 504 is configured to search for accessible WiFi hotspots.

The first acquisition unit 505 is configured to acquire an operating band of a first WiFi hotspot and an operating band of a second WiFi hotspot, if the search unit finds that the first WiFi hotspot and the second WiFi hotspot are accessible.

The connecting-and-establishing unit 506 is configured to connect to the first WiFi hotspot and the second WiFi hotspot, and establish the first WiFi data link and the second WiFi data link, when the operating band of the first WiFi hotspot and the operating band of the second WiFi hotspot are not within a same frequency band.

Optionally, the packet offloading apparatus 500 may further include a sending unit 507.

The determination unit 502 is further configured to determine whether the first WiFi hotspot or the second WiFi hotspot is a dual-band WiFi hotspot, when the operating band of the first WiFi hotspot and the operating band of the second WiFi hotspot are within a same frequency band.

The sending unit 507 is configured to send a band switching instruction to the dual-band WiFi hotspot selected from the first WiFi hotspot and the second WiFi hotspot, when at least one of the first WiFi hotspot and the second WiFi hotspot is the dual-band WiFi hotspot. The band switching instruction is configured to switch the operating band of the dual-band WiFi hotspot selected from the first WiFi hotspot and the second WiFi hotspot.

The connecting-and-establishing unit 506 is further configured to connect to the first WiFi hotspot and the second WiFi hotspot, and establish the first WiFi data link and the second WiFi data link, when the operating band of the first WiFi hotspot and the operating band of the second WiFi hotspot are not within a same frequency band.

Optionally, the packet offloading apparatus 500 may further include a second acquisition unit 508.

The second acquisition unit 508 is configured to acquire a type of the plurality of packets required to be transmitted.

The transmission unit 503 is further configured to allocate, in accordance with the packet allocation ratio, a plurality of packets required to be transmitted to the first WiFi data link, the second WiFi data link, and the mobile data link for transmitting, when the type of the plurality of packets required to be transmitted is not a server-designated type.

The transmission unit 503 is further configured to transmit the plurality of packets required to be transmitted through the mobile data link, when the type of the plurality of packets required to be transmitted is the server-designated type.

Optionally, the packet offloading apparatus 500 may further include a third acquisition unit 509.

The third acquisition unit 509 is configured to acquire a user type.

In the aspect of determining a packet allocation ratio of the first WiFi data link, the second WiFi data link, and the mobile data link, according to the link quality of the first WiFi data link, the link quality of the second WiFi data link, and the link quality of the mobile data link, the determination unit 502 is specifically configured to determine the packet allocation ratio of the first WiFi data link, the second WiFi data link, and the mobile data link, according to the link quality of the first WiFi data link, the link quality of the second WiFi data link, the link quality of the mobile data link, and the user type.

Optionally, in the aspect of determining the packet allocation ratio of the first WiFi data link, the second WiFi data link, and the mobile data link, according to the link quality of the first WiFi data link, the link quality of the second WiFi data link, the link quality of the mobile data link, and the user type, the determination unit 502 is specifically configured to:

determine an initial packet allocation ratio of the first WiFi data link, the second WiFi data link, and the mobile data link, according to the link quality of the first WiFi data link, the link quality of the second WiFi data link, the link quality of the mobile data link, and the user type;

change the initial packet allocation ratio by increasing a ratio of the first WiFi data link to the mobile data link and a ratio of the second WiFi data link to the mobile data link, thereby obtaining the packet allocation ratio of the first WiFi data link, the second WiFi data link, and the mobile data link, if the user type is a traffic-sensitive type; and change the initial packet allocation ratio by decreasing a ratio of the first WiFi data link to the mobile data link and a ratio of the second WiFi data link to the mobile data link, thereby obtaining the packet allocation ratio of the first WiFi data link, the second WiFi data link, and the mobile data link, if the user type is a non-traffic-sensitive type.

By implementing the packet offloading apparatus shown in FIG. 5, the allocation ratio of the packets to be transmitted on the three links can be determined according to the link quality of the first WiFi data link, the link quality of the second WiFi data link, and the link quality of the mobile data link, and the packets can be reasonably allocated to two WiFi data links and one mobile data link for transmission, thereby making full use of the packet sending and receiving capabilities of the WiFi networks and the mobile data network, and improving user experiences.

Figure 6:
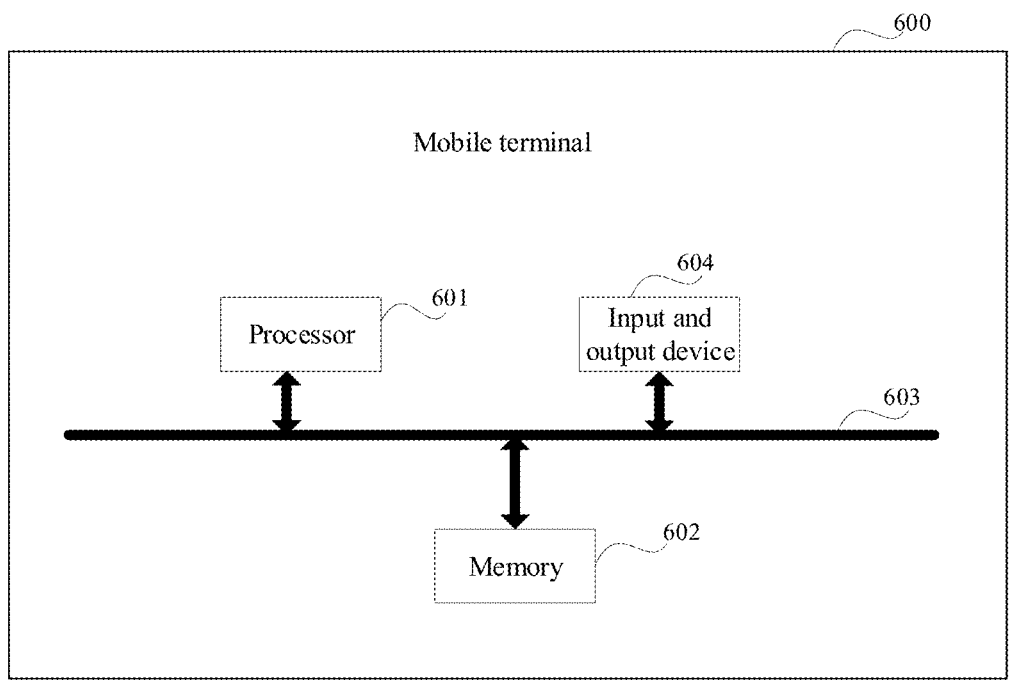
FIG. 6 is a schematic diagram showing the structure of a mobile terminal according to an embodiment of the disclosure.

FIG. 6 illustrates a schematic diagram showing the structure of a mobile terminal according to an embodiment of the disclosure. As shown in FIG. 6, the mobile terminal 600 includes a processor 601 and a memory 602. The mobile terminal 600 may further include a bus 603. The processor 601 and the memory 602 may be connected to each other through the bus 603. The bus 603 may be the Peripheral Component Interconnect (PCI) bus or the Extended Industry Standard Architecture (EISA) bus, etc. The bus 603 can be divided into the address bus, the data bus, the control bus, and so on. In order to facilitate the representation, in FIG. 6, only one thick line is adopted to represents the bus, but it does not mean that there is only one bus or one type of bus. The mobile terminal 600 may further include an input and output device 604. The input and output device 604 may include a display screen, such as a liquid crystal display. The memory 602 is configured to store one or more programs containing instructions, and the processor 601 is configured to call the instructions stored in the memory 602 to perform some or all of the above method steps in FIGS. 1 to 4.

By implementing the mobile terminal shown in FIG. 6, the allocation ratio of the packets to be transmitted on the three links can be determined according to the link quality of the first WiFi data link, the link quality of the second WiFi data link, and the link quality of the mobile data link, and the packets can be reasonably allocated to two WiFi data links and one mobile data link for transmission, thereby making full use of the packet sending and receiving capabilities of the WiFi networks and the mobile data network, and improving user experiences.

Figure 7:
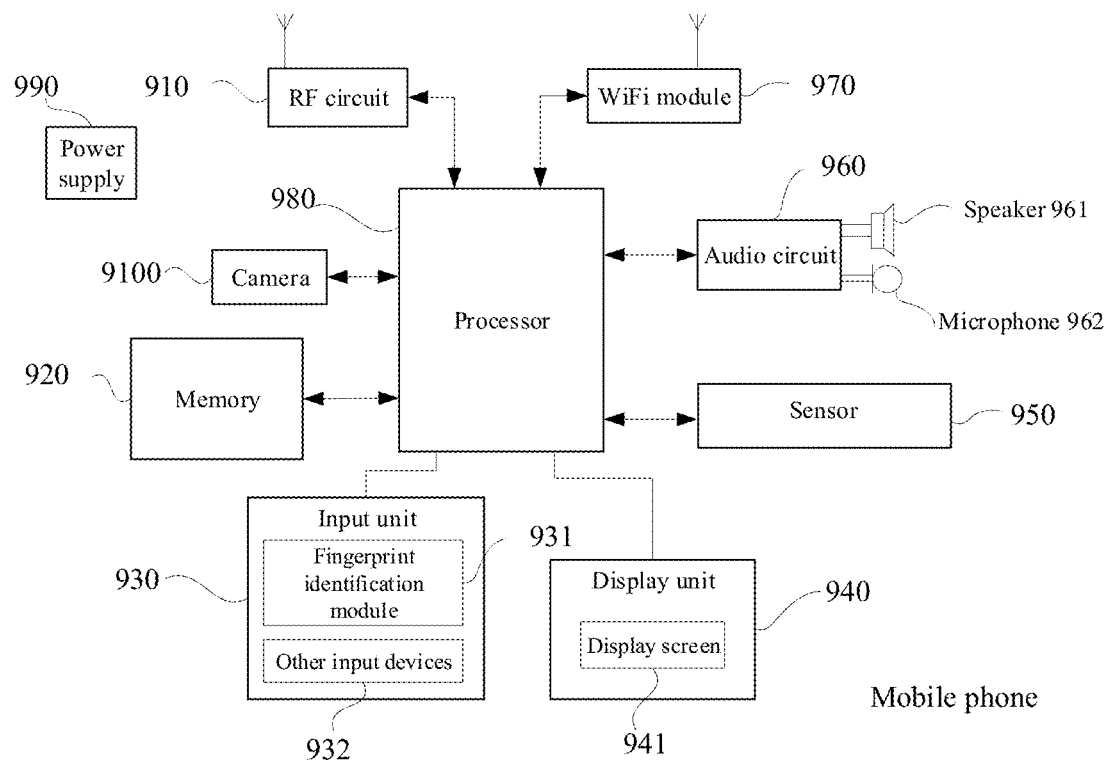
FIG. 7 is a schematic diagram showing the structure of another mobile terminal according to an embodiment of the disclosure.

The embodiment of the disclosure further provides another mobile terminal, as shown in FIG. 7. In order to facilitate the description, only the parts related to the embodiment of the disclosure are shown. For specific technical details that are not disclosed, please refer to the method part of the embodiments of the disclosure. The mobile terminal can be any terminal device including mobile phone, tablet computer, PDA (Personal Digital Assistant), POS (Point of Sales), in-vehicle computer, etc. For example, the mobile terminal is a mobile phone.

FIG. 7 illustrates a block diagram of the partial structure of a mobile phone related to a mobile terminal according to an embodiment of the disclosure. Referring to FIG. 7, the mobile phone includes: a radio frequency (RF) circuit 910, a memory 920, an input unit 930, a display unit 940, a sensor 950, an audio circuit 960, a wireless fidelity (WiFi) module 970, a processor 980, a power supply 990, and other components. Those of ordinary skill in the art can understand that, the structure of the mobile phone shown in FIG. 7 does not constitute a limitation to the mobile phone, and the mobile phone may include more or less components than those shown in the figure, or a combination of some components, or different component arrangements.

Each component of the mobile phone will be introduced in detail below with reference to FIG. 7.

The RF circuit 910 can be used for receiving and sending message. Generally, the RF circuit 910 includes, but is not limited to, an antenna, at least one amplifier, a transceiver, a coupler, a low noise amplifier (LNA), a duplexer, etc. In addition, the RF circuit 910 may also communicate with other devices through wireless communication and network. The above-mentioned wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS), etc.

The memory 920 may be configured to store software programs and modules. The processor 980 implements various functional applications and data processing of the mobile phone by running the software programs and modules stored in the memory 920. The memory 920 may mainly include a program storage area and a data storage area. The program storage area may store an operating system, applications required by at least one function, etc. The data storage area may store data created according to the usage of the mobile phone, etc. In addition, the memory 920 may include a high-speed random-access memory, and may further include a non-volatile memory, such as at least one disk storage device, flash memory, or other volatile solid-state memory devices.

The input unit 930 may be configured to receive input digital or character information and generate the key signal input related to the user settings and function control of the mobile phone. Specifically, the input unit 930 may include a fingerprint identification module 931 and other input devices 932. The fingerprint identification module 931 can collect the fingerprint data of the user on it. In addition to the fingerprint identification module 931, the input unit 930 may further include other input devices 932. Specifically, other input devices 932 may include, but are not limited to, one or more of a touch screen, a physical keyboard, function keys (such as a volume control button, a switch button, etc.), a trackball, a mouse, and a joystick.

The display unit 940 may be configured to display information input by the user or provided to the user, and various menus of the mobile phone. The display unit 940 may include a display screen 941, and optionally, the display screen 941 may be configured in the form of a liquid crystal display (LCD), a light-emitting diode (LED), or an organic light-emitting diode (OLED), etc.

The mobile phone may further include at least one sensor 950, such as a photosensor, a motion sensor, a pressure sensor, a temperature sensor, and other sensors. Specifically, the photosensor may include an ambient light sensor (also known as a light sensor) and a proximity sensor. The ambient light sensor can adjust the backlight brightness of the mobile phone according to the brightness of the ambient light, thereby adjusting the brightness of the display screen 941, and the proximity sensor can turn off the display screen 941 and/or the backlight when the mobile phone is moved to the ear. As a kind of motion sensor, the accelerometer can detect the magnitude of acceleration in various directions (usually three-axis), and can detect the magnitude and direction of gravity under stationary state. It can be used for mobile phone posture recognition (such as horizontal and vertical screen switching, and magnetometer posture calibration), vibration recognition functions (such as pedometer, knocking), etc. Other sensors, such as gyroscope, barometer, hygrometer, thermometer, and infrared sensor, can be configured in the mobile phone, which will not be repeated here.

The audio circuit 960, the speaker 961, and the microphone 962 can provide an audio interface between the user and the mobile phone. The audio circuit 960 can transmit the electric signal converted from the received audio data to the speaker 961, and the electric signal is converted into a sound signal by the speaker 961 for playback. On the other hand, the microphone 962 converts the collected sound signal into an electric signal, the audio circuit 960 receives the electric signal and converts it into audio data, and the audio processor 980 processes the audio data and then sent it to, for example, another mobile phone via the RF circuit 910, or the audio data is stored to the memory 920 for further processing.

WiFi is a short-distance wireless transmission technology. The mobile phone can help users send and receive emails, browse web pages, and access streaming media through the WiFi module 970. WiFi provides users with wireless broadband Internet access. Although FIG. 7 shows the WiFi module 970, it will be understood that the WiFi module 970 is not a necessary component of the mobile phone, and it can be omitted as needed without changing the essence of the disclosure.

The processor 980 is the control center of the mobile phone, which connects various parts of the entire mobile phone using various interfaces and lines. By running or executing the software programs and/or modules stored in the memory 920, and calling the data stored in the memory 920, the processor 980 implements various functions and data processing of the mobile phone, so as to monitor the mobile phone in general. Optionally, the processor 980 may include one or more processing units. Preferably, the processor 980 may integrate an application processor and a modem processor, the application processor mainly processes the operating system, user interface, application programs, etc., and the modem processor mainly processes wireless communication. It can be understood that the modem processor may not be integrated into the processor 980.

The mobile phone further includes a power supply 990 (such as a battery) for supplying power to various components. Preferably, the power supply may be logically connected to the processor 980 through a power management system, such that functions such as charging, discharging, and power consumption management can be managed through the power management system.

The mobile phone may further include a camera 9100. The camera 9100 is configured to capture images and videos, and transmit the captured images and videos to the processor 980 for processing.

The mobile phone may further include a Bluetooth module, which will not be repeated here.

In the embodiments shown in FIGS. 1 to 4, the steps of each method can be implemented based on the structure of the mobile phone.

An embodiment of the disclosure further provides a computer storage medium. The computer storage medium stores a computer program for electronic data exchange, and the computer program enables a computer to perform part or all of the steps of any one of the packet offloading methods described in the above method embodiments.

An embodiment of the disclosure further provides a computer program product. The computer program product includes a non-transitory computer-readable storage medium storing a computer program. The computer program is operable to cause a computer to perform part or all of the steps of any one of the packet offloading methods described in the above method embodiments.

It should be noted that, for the sake of simple description, the above method embodiments are all expressed as a series of action combinations. However, those of ordinary skill in the art should know that the disclosure is not limited to the described action sequence, because according to the disclosure, some steps may be performed in other order or performed simultaneously. Secondly, those of ordinary skill in the art should also know that the embodiments described in the specification are all preferred embodiments, and the actions and modules involved are not necessarily required by the application.

In the above embodiments, the description of each embodiment has its own emphasis. For the part not described in detail in one embodiment, reference may be made to related descriptions of other embodiments.

In the several embodiments provided in the disclosure, it should be understood that the disclosed apparatus may be implemented in other forms. For example, the apparatus embodiments described above are only illustrative. For example, the division of units is only a logical function division, and there may be other division methods in actual implementation, for example, multiple units or components can be combined or integrated into another system, or some features can be ignored or not implemented. In addition, the shown or discussed coupling, such as direct coupling or communication connection, may be indirect coupling or communication connection through some interfaces, apparatus, or units, and it may be an electrical coupling or other forms of coupling.

The units described above as separate components may or may not be physically separated, and the components shown as units may or may not be physical units, that is, the units may be located in one place, or they may be distributed on multiple network units. Some or all of the units may be selected according to actual needs to achieve the objectives of the solutions of the embodiments.

In addition, the functional units in each embodiment of the disclosure may be integrated into one processing unit, or each unit may exist physically alone, or two or more units may be integrated into one unit. The integrated unit can be implemented in the form of hardware or in the form of software functional unit.

If the integrated unit is implemented in the form of a software functional unit and sold or used as an independent product, it can be stored in a computer readable memory. Based on this understanding, the technical solution of the disclosure essentially, or the part that contributes to the existing technology, or all or part of the technical solution can be embodied in the form of a software product. The computer software product is stored in a memory and includes a number of instructions to enable a computer device (which may be a personal computer, a server, or a network device, etc.) to perform all or part of the steps of the methods in various embodiments of the disclosure. The memory includes U disk, Read-Only Memory (ROM), Random Access Memory (RAM), mobile hard disk, magnetic disk, or optical disk, and other media that can store program codes.

Those of ordinary skill in the art can understand that all or part of the steps in various methods of the above embodiments can be completed by relevant hardware with the instruction of a program. The program can be stored in a computer-readable memory, and the memory may include flash disk, Read-Only Memory (ROM), Random Access Memory (RAM), magnetic disk, or CD, etc.

The embodiments of the disclosure are described in detail above, and specific examples are used herein to illustrate the principles and implementation of the disclosure. The descriptions of the above embodiments are only used to help understand the methods and core ideas of the disclosure; at the same time, for those of ordinary skill in the art, the ideas of the disclosure may change in the specific implementation and the scope of application. In summary, the content of the specification should not be construed as limiting the disclosure.

What is claimed is:

1. A packet offloading method, comprising:
   detecting link quality of a first WiFi data link, link quality of a second WiFi data link, and link quality of a mobile data link;
   determining a packet allocation ratio of the first WiFi data link, the second WiFi data link, and the mobile data link, according to the link quality of the first WiFi data link, the link quality of the second WiFi data link, and the link quality of the mobile data link; and
   allocating, in accordance with the packet allocation ratio, a plurality of packets to at least one of the first WiFi data link, the second WiFi data link, and the mobile data link, and transmitting the plurality of packets through the at least one of the first WiFi data link, the second WiFi data link, and the mobile data link;
   wherein detecting the link quality of the first WiFi data link, the link quality of the second WiFi data link, and the link quality of the mobile data link comprises:
      testing a maximum data transmission rate of the first WiFi data link, a maximum data transmission rate of the second WiFi data link, and a maximum data transmission rate of the mobile data link, and determining the link quality of the first WiFi data link, the link quality of the second WiFi data link, and the link quality of the mobile data link based on the maximum data transmission rate of the first WiFi data link, the maximum data transmission rate of the second WiFi data link, and the maximum data transmission rate of the mobile data link.

2. The method as claimed in claim 1, wherein before detecting the link quality of a first WiFi data link, the link quality of a second WiFi data link, and the link quality of a mobile data link, the method further comprises:
   acquiring an operating band of a first WiFi hotspot and an operating band of a second WiFi hotspot in response to finding the first WiFi hotspot and the second WiFi hotspot are accessible; and
   connecting to the first WiFi hotspot and the second WiFi hotspot in response to the operating band of the first WiFi hotspot and the operating band of the second WiFi hotspot being not within a same frequency band, and establishing the first WiFi data link and the second WiFi data link.

3. The method as claimed in claim 2, further comprising:
   determining whether the first WiFi hotspot or the second WiFi hotspot is a dual-band WiFi hotspot in response to the operating band of the first WiFi hotspot and the operating band of the second WiFi hotspot being within a same frequency band; and
   sending a band switching instruction to the dual-band WiFi hotspot selected from the first WiFi hotspot and the second WiFi hotspot in response to at least one of the first WiFi hotspot and the second WiFi hotspot being the dual-band WiFi hotspot, the band switching instruction being configured to switch the operating band of the dual-band WiFi hotspot selected from the first WiFi hotspot and the second WiFi hotspot.

4. The method as claimed in claim 3, wherein allocating, in accordance with the packet allocation ratio, a plurality of packets to at least one of the first WiFi data link, the second WiFi data link, and the mobile data link, and transmitting the plurality of packets through the at least one of the first WiFi data link, the second WiFi data link, and the mobile data link comprising:
   acquiring a type of the plurality of packets;
   allocating, in accordance with the packet allocation ratio, a plurality of packets to at least one of the first WiFi data link, the second WiFi data link, and the mobile data link in response to the type of the plurality of packets being not a server-designated type, and transmitting the plurality of packets through the at least one of the first WiFi data link, the second WiFi data link, and the mobile data link.

5. The method as claimed in claim 4, wherein allocating, in accordance with the packet allocation ratio, a plurality of packets to at least one of the first WiFi data link, the second WiFi data link, and the mobile data link, and transmitting the plurality of packets through the at least one of the first WiFi data link, the second WiFi data link, and the mobile data link further comprising:
   transmitting the plurality of packets through the mobile data link in response to the type of the plurality of packets being the server-designated type.

6. The method as claimed in claim 1, wherein before determining a packet allocation ratio of the first WiFi data link, the second WiFi data link, and the mobile data link, according to the link quality of the first WiFi data link, the link quality of the second WiFi data link, and the link quality of the mobile data link, the method further comprises:
   acquiring a user type;
   the determining a packet allocation ratio of the first WiFi data link, the second WiFi data link, and the mobile data link, according to the link quality of the first WiFi data link, the link quality of the second WiFi data link, and the link quality of the mobile data link comprises:
      determining the packet allocation ratio of the first WiFi data link, the second WiFi data link, and the mobile data link, according to the link quality of the first WiFi data link, the link quality of the second WiFi data link, the link quality of the mobile data link, and the user type.

7. The method as claimed in claim 6, wherein the determining the packet allocation ratio of the first WiFi data link, the second WiFi data link, and the mobile data link, according to the link quality of the first WiFi data link, the link quality of the second WiFi data link, the link quality of the mobile data link, and the user type comprises:
   determining an initial packet allocation ratio of the first WiFi data link, the second WiFi data link, and the mobile data link, according to the link quality of the first WiFi data link, the link quality of the second WiFi data link, the link quality of the mobile data link, and the user type;
   changing the initial packet allocation ratio by increasing a ratio of the first WiFi data link to the mobile data link and a ratio of the second WiFi data link to the mobile data link in response to the user type being a traffic-sensitive type, and obtaining the packet allocation ratio of the first WiFi data link, the second WiFi data link, and the mobile data link; and
   changing the initial packet allocation ratio by decreasing a ratio of the first WiFi data link to the mobile data link and a ratio of the second WiFi data link to the mobile data link in response to the user type being a non-traffic-sensitive type, and obtaining the packet allocation ratio of the first WiFi data link, the second WiFi data link, and the mobile data link.

8. The method as claimed in claim 1, wherein the detecting the link quality of a first WiFi data link further comprises:
  testing a data transmission rate, a round-trip time, a packet loss rate, and a bit error rate of the first WiFi data link, and determining the link quality of the first WiFi data link based on the round-trip time, the data transmission rate, the packet loss rate, and the bit error rate of the first WiFi data link;
the detecting the link quality of a second WiFi data link further comprises:
  testing a data transmission rate, a round-trip time, a packet loss rate, and a bit error rate of the second WiFi data link, and determining the link quality of the second WiFi data link based on the round-trip time, the data transmission rate, the packet loss rate, and the bit error rate of the second WiFi data link; and
the detecting the link quality of a mobile data link further comprises:
  testing a data transmission rate, a round-trip time, a packet loss rate, and a bit error rate of the mobile data link, and determining the link quality of the mobile data link based on the round-trip time, the data transmission rate, the packet loss rate, and the bit error rate of the mobile data link.

9. The method as claimed in claim 1, wherein the determining the link quality of the first WiFi data link, the link quality of the second WiFi data link, and the link quality of the mobile data link based on the maximum data transmission rate of the first WiFi data link, the maximum data transmission rate of the second WiFi data link, and the maximum data transmission rate of the mobile data link comprises:
  calculating a ratio of the maximum data transmission rate of the first WiFi data link to a sum of the maximum data transmission rate of the first WiFi data link, the maximum data transmission rate of the second WiFi data link, and the maximum data transmission rate of the mobile data link, and obtaining the link quality of the first WiFi data link;
  calculating a ratio of the maximum data transmission rate of the second WiFi data link to the sum of the maximum data transmission rate of the first WiFi data link, the maximum data transmission rate of the second WiFi data link, and the maximum data transmission rate of the mobile data link, and obtaining the link quality of the second WiFi data link; and
  calculating a ratio of the maximum data transmission rate of the mobile data link to the sum of the maximum data transmission rate of the first WiFi data link, the maximum data transmission rate of the second WiFi data link, and the maximum data transmission rate of the mobile data link, and obtaining the link quality of the mobile data link.

10. The method as claimed in claim 9, determining a packet allocation ratio of the first WiFi data link, the second WiFi data link, and the mobile data link, according to the link quality of the first WiFi data link, the link quality of the second WiFi data link, and the link quality of the mobile data link comprises:
  determining a ratio of the link quality of the first WiFi data link, the link quality of the second WiFi data link, and the link quality of the mobile data link as the packet allocation ratio of the first WiFi data link, the second WiFi data link, and the mobile data link.

11. The method as claimed in claim 1, wherein, before determining the link quality of the first WiFi data link, the link quality of the second WiFi data link, and the link quality of the mobile data link based on the maximum data transmission rate of the first WiFi data link, the maximum data transmission rate of the second WiFi data link, and the maximum data transmission rate of the mobile data link, the method further comprises:
  correcting the maximum data transmission rate of the first WiFi data link, the maximum data transmission rate of the second WiFi data link, and the maximum data transmission rate of the mobile data link by a speed calculated from a data increment on respective reception (rx) interfaces.

12. The method as claimed in claim 8, wherein the determining the link quality of the first WiFi data link based on the round-trip time, the data transmission rate, the packet loss rate, and the bit error rate of the first WiFi data link comprises:
  scoring based on the round-trip time, the data transmission rate, the packet loss rate, and the bit error rate of the first WiFi data link, and obtaining a quality score of the first WiFi data link;
determining the link quality of the second WiFi data link based on the round-trip time, the data transmission rate, the packet loss rate, and the bit error rate of the second WiFi data link comprises:
  scoring based on the round-trip time, the data transmission rate, the packet loss rate, and the bit error rate of the second WiFi data link, and obtaining a quality score of the second WiFi data link; and
determining the link quality of the mobile data link based on the round-trip time, the data transmission rate, the packet loss rate, and the bit error rate of the mobile data link comprises:
  scoring based on the round-trip time, the data transmission rate, the packet loss rate, and the bit error rate of the mobile data link, and obtaining a quality score of the mobile data link.

13. The method as claimed in claim 12, wherein the determining a packet allocation ratio of the first WiFi data link, the second WiFi data link, and the mobile data link, according to the link quality of the first WiFi data link, the link quality of the second WiFi data link, and the link quality of the mobile data link comprises:
  determining a ratio of the quality score of the first WiFi data link, the quality score of the second WiFi data link, and the quality score of the mobile data link as the packet allocation ratio of the first WiFi data link, the second WiFi data link, and the mobile data link.

14. A mobile terminal, comprising a processor and a memory storing one or more programs which, when being executed by the processor, cause the processor to implement a packet offloading method, the method comprising:
  detecting link quality of a first WiFi data link, detecting link quality of a second WiFi data link, and detecting link quality of a mobile data link;
  determining a packet allocation ratio of the first WiFi data link, the second WiFi data link, and the mobile data link, according to the link quality of the first WiFi data link, the link quality of the second WiFi data link, and the link quality of the mobile data link; and
  allocating, in accordance with the packet allocation ratio, a plurality of packets to the first WiFi data link, the second WiFi data link, and the mobile data link, and transmitting the plurality of packets through each of the first WiFi data link, the second WiFi data link, and the mobile data link;

wherein detecting the link quality of the first WiFi data link, the link quality of the second WiFi data link, and the link quality of the mobile data link comprises:
testing a maximum data transmission rate of the first WiFi data link, a maximum data transmission rate of the second WiFi data link, and a maximum data transmission rate of the mobile data link, and determining the link quality of the first WiFi data link, the link quality of the second WiFi data link, and the link quality of the mobile data link based on the maximum data transmission rate of the first WiFi data link, the maximum data transmission rate of the second WiFi data link, and the maximum data transmission rate of the mobile data link.

15. The mobile terminal as claimed in claim 14, wherein detecting the link quality of the first WiFi data link further comprises:
testing a data transmission rate, a round-trip time, a packet loss rate, and a bit error rate of the first WiFi data link,
scoring based on the round-trip time, the data transmission rate, the packet loss rate, and the bit error rate of the first WiFi data link, and obtain a quality score of the first WiFi data link; and
determining a quality score of the first WiFi data link.

16. The mobile terminal as claimed in claim 15, wherein detecting the link quality of the second WiFi data link further comprises:
testing a data transmission rate, a round-trip time, a packet loss rate, and a bit error rate of the second WiFi data link,
scoring based on the round-trip time, the data transmission rate, the packet loss rate, and the bit error rate of the second WiFi data link, and
determining a quality score of the second WiFi data link.

17. The mobile terminal as claimed in claim 16, wherein detecting the link quality of the mobile data link comprises:
testing a data transmission rate, a round-trip time, a packet loss rate, and a bit error rate of the mobile data link,
scoring based on the round-trip time, the data transmission rate, the packet loss rate, and the bit error rate of the mobile data link, and
determining a quality score of the mobile data link.

18. The mobile terminal as claimed in claim 17, wherein determining a packet allocation ratio comprises:
determining a ratio of the quality score of the first WiFi data link, the quality score of the second WiFi data link, and the quality score of the mobile data link as the packet allocation ratio of the first WiFi data link, the second WiFi data link, and the mobile data link.

19. The mobile terminal as claimed in claim 14, wherein before determining a packet allocation ratio of the first WiFi data link, the second WiFi data link, and the mobile data link, according to the link quality of the first WiFi data link, the link quality of the second WiFi data link, and the link quality of the mobile data link, the method further comprises:
acquiring a user type;
the determining a packet allocation ratio of the first WiFi data link, the second WiFi data link, and the mobile data link, according to the link quality of the first WiFi data link, the link quality of the second WiFi data link, and the link quality of the mobile data link comprises:
determining the packet allocation ratio of the first WiFi data link, the second WiFi data link, and the mobile data link, according to the link quality of the first WiFi data link, the link quality of the second WiFi data link, the link quality of the mobile data link, and the user type.

20. A non-transitory computer-readable storage medium, storing a computer program for electronic data exchange, wherein the computer program, when executed by a computer, causes the computer to perform steps of:
detecting link quality of a first WiFi data link, link quality of a second WiFi data link, and link quality of a mobile data link;
acquiring a user type;
determining a packet allocation ratio of the first WiFi data link, the second WiFi data link, and the mobile data link, according to the link quality of the first WiFi data link, the link quality of the second WiFi data link, the link quality of the mobile data link, and the user type; and
allocating, in accordance with the packet allocation ratio, a plurality of packets to the first WiFi data link, the second WiFi data link, and the mobile data link, and transmitting the plurality of packets through each of the first WiFi data link, the second WiFi data link, and the mobile data link.

\* \* \* \* \*